May 14, 1963 L. T. BARNES 3,090,021

TUNING DEVICE WITH SPECIALLY SHAPED CAPACITOR PLATES

Filed June 23, 1961 2 Sheets-Sheet 1

INVENTOR.
LLEWELLYN T. BARNES

BY Amster & Levy

ATTORNEYS

TUNING DEVICE WITH SPECIALLY SHAPED CAPACITOR PLATES

Filed June 23, 1961 2 Sheets-Sheet 2

INVENTOR.
LLEWELLYN T. BARNES
BY
Amster & Levy
ATTORNEYS

United States Patent Office 3,090,021

Patented May 14, 1963

3,090,021
TUNING DEVICE WITH SPECIALLY SHAPED CAPACITOR PLATES

Llewellyn T. Barnes, 155 Atlantic Ave., Freeport, N.Y.
Filed June 23, 1961, Ser. No. 119,149
5 Claims. (Cl. 334—82)

This invention relates to a variable parallel resonant device, and more particularly to a high frequency tuning component.

An object of this invention is to provide a simply constructed high frequency variable tuning device having a high stability which is adapted to function as an inductor, capacitor or resonator.

Another object of this invention is to provide a resonator which will yield high resonance, with the resonator having heretofore unattainably great capacities for an adjustable device.

A further object of the invention is to provide a device for use in a high frequency tuning circuit that will eliminate the necessity for a crystal or a transistor for control and which has a stability comparable with that of a crystal control circuit.

The concept of this invention features the use of a casing of steatite or other insulating material having printed or otherwise deposited on the inner surface thereof an elliptical spiral of silver or other conducting material. A rotating disc is disposed in the casing for rotation about an axis concentric with the spiral so that at least a portion of the disc will always overlap the spiral. The disc is made of an insulating material such as steatite, synthetic plastics, mica or a mixture of titanium dioxide and magnesium titanate. The disc is provided with elliptical conductors of silver or other electrically conductive materials which are spaced from the spiral conductor.

The silver is deposited on the casing and disc in any suitable way. For example a silver paint containing a finely divided metallic silver, an oil vehicle and a glaze may be applied to the casing and disc by spraying, brushing, or by silk screen printing process and the silver paint may then be fired on the surfaces of the casing and disc. The casing and disc are preferably provided with grooves therein and the silver metal paint is deposited in the grooves so as to space the conductors a suitable predetermined distance from each other. The silver metal point is applied to a thickness of at least one or two mils, since if the coating is too thin the resistance of the conductors will be too great. The width of these conductors should be at least equal to or less than the space between adjacent coils of the spiral conductor. Silver is the preferred conductive metal, but of course any conducting metal may be employed such as gold, aluminum, copper, etc.

The casing is preferably steatite but it may be made of any well known insulating material such as mica, glass, synthetic resins such as phenol formaldehyde resins, tetrafluoro ethylene, polystyrene and the like. The disc is preferably made of steatite or other suitable plastic materials. A mixture of titanium dioxide and magnesium titanate which has a dielectric constant which varies between 15 and 90 may be employed.

Still further objects and features of this invention reside in the provision of a resonator that is simple in construction, capable of being used in a tuned circuit so as to replace a transistor as is used in conventional radio circuitry, which may be produced relatively inexpensively by mass production techniques, and which is quite durable.

These together with the various ancillary objects and features of the invention which will become apparent as the following description proceeds, are attained by this resonator, preferred embodiments of which have been illustrated in the accompanying drawings, by way of example only wherein.

Figure 1:
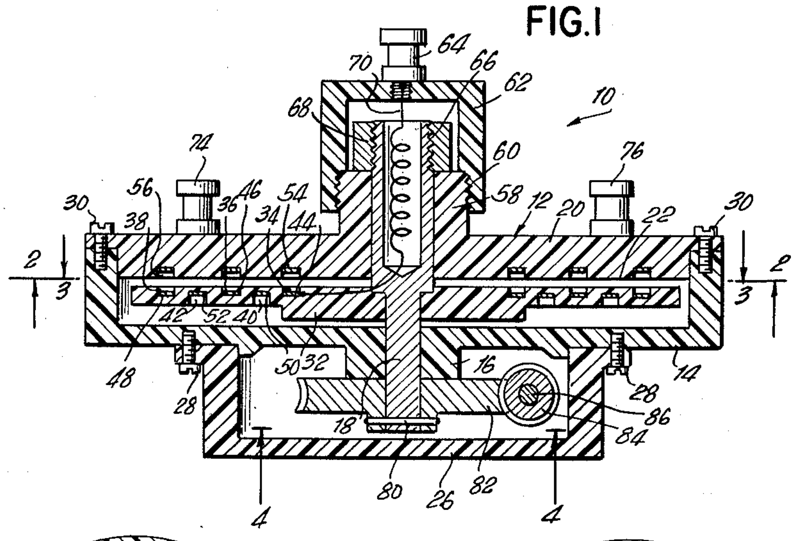
FIG. 1 is a vertical sectional view of an embodiment of the invention as taken along a center line of the device.
Figure 2:
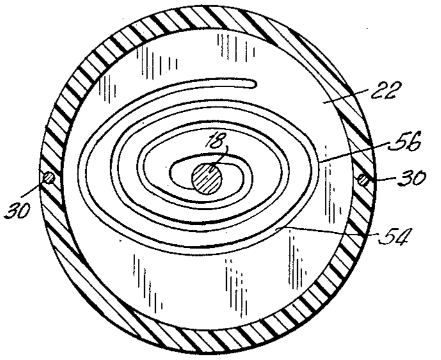
FIG. 2 is a horizontal sectional view taken along the plane of line 2—2 in FIG. 1 illustrating in a reduced scale the construction and shape of the spiral conductor.
Figure 3:
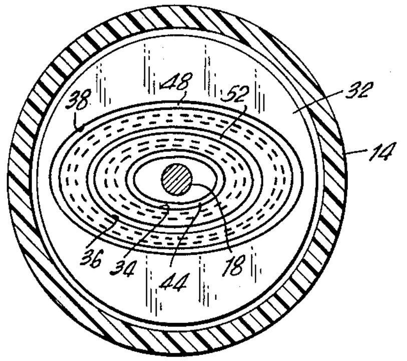
FIG. 3 is a horizontal sectional view of the invention taken along the plane of line 3—3 in FIG. 1 illustrating in particular the shape and location on the disc of the elliptical conductors.
Figure 4:
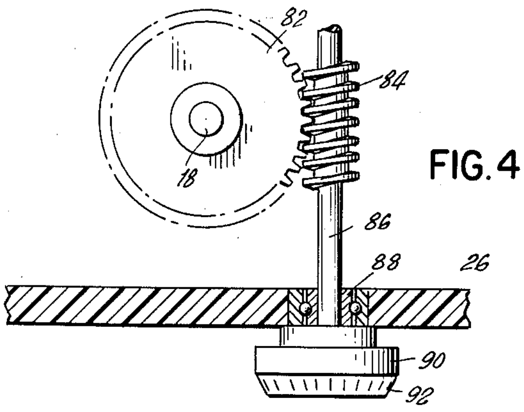
FIG. 4 is a partial horizontal sectional view taken along the plane of line 4—4 in FIG. 1 illustrating in particular the means for rotating the disc from a position external of the casing.

With continuing reference to the accompanying drawings wherein like reference numerals designate similar parts throughout the various views, and with initial attention directed to the embodiment illustrated in FIGS. 1 to 4 there is shown a resonator generally indicated at 10 which includes a casing 12. The casing 12 is preferably formed of any suitable insulating material such as steatite, synthetic resins, mica, or titanium dioxide compositions such as a mixture of titanium dioxide and magnesium titanate having a dielectric constant selected between 15 and 90. The casing 12 is formed of a number of parts which may be secured together in a detachable manner so as to permit ease of assembly and repair as desired. The casing 12 includes a dish shaped portion 14 provided with a cylindrical projection 16 which serves as a bearing for rotatably mounting a shaft 18 in the casing. The casing further includes an upper portion 20 having a substantially flat surface 22 therein and a lower relatively smaller dish shaped portion 26, which may be secured by screws 28 or other fasteners to the portion 14. Screws 30 may be used to secure the upper portion 20 to the dish shaped portion 14. Of course, these screws may be formed of an insulating material having a suitable dielectric constant or of metal.

Fixedly mounted on the shaft 18 is a disc 32 which is provided with a series of elliptical grooves 34, 36 and 38 in the upper surface thereof as well as grooves 40 and 42 in its lower surface. The grooves 40 and 42 may be considerably deeper than the grooves 34, 36 and 38.

Elliptical conductors 44, 46, 48, 50 and 52 are formed in the grooves 34, 36, 38, 40 and 42 by any suitable process. Of course, the conductors can be in the form of strips of suitable metal such as silver, gold, copper, aluminum, etc. or may be formed by a process of spraying a silver paint containing a finely divided metallic silver, an oil vehicle, and a glaze by spraying, brushing or by silk screen printing process after which the paint may be fired. The conductors are arranged so as to be concentrically disposed about the shaft 18 and each other with their major and minor axes in alignment. Since the grooves 40 and 42 are deeper than the other grooves, all of the conductors lie in the same plane and preferably are of the same thickness. Of course, there will be differences in capacitance due to the fact that there is a layer of dielectric between the conductors 50 and 52 and the spiral conductor 54 which is formed in the same manner as the elliptical conductors and which is disposed in the elliptical spiral groove 56 formed in the surface 22 of the portion 20 of the casing 12.

The portion 20 of the casing 12 has a hub 58 which is threaded as at 60 for further reception of a cap 62 having a terminal 64 secured thereto. The upper end of the shaft is externally threaded as at 66 for threaded reception of a thrust bearing 68 affixed thereto. A conductor 70 connects or grounds the elliptical conductor 44 to the terminal 64 while the other elliptical conductors 46, 48, 50 and 52 have lead in wires, not shown, connected thereto which in turn are connected to other circuit components.

A plurality of terminals indicated at 74 and 76 are secured to the portion 20 of the casing and are connected to various points of the spiral elliptical conductor 54 so that various frequencies may be picked off of the spiral elliptical conductor 54 for the various electrical components of the electrical circuit in which the resonator 10 is connected.

In order to permit rotation of the disc 32, there is fixed to the shaft as by a key 80 a pinion or gear 82 which meshes with a worm gear 84. The worm gear 84 is mounted or integrally formed on an actuation rod 86 journalled by means of bearing 88 in the disc shaped portion 26 of the casing. A knob 90 having any suitable indicia 92 thereon may be provided for rotating the rod 86 and thus rotating the shaft to rotate the disc 32 and thereby position the elliptical conductors 44, 36, 38, 50 and 52 with respect to the spiral conductor 50.

In operation, the device is connected in an appropriate circuit and this circuit is tuned by rotating the disc 36 so that the major axis of the elliptical conductors moves out of alignment with the major axis of the spiral conductor 54 thereby varying the capacitance of the resonator 10.

Figure 5:
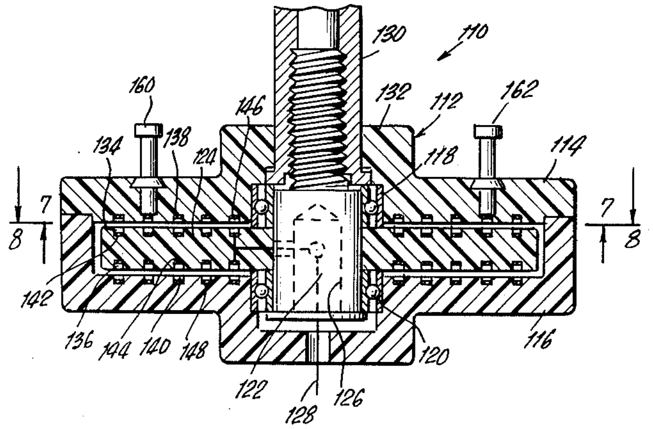
FIG. 5 is a partial vertical sectional view of a modified embodiment of the invention.
Figure 6:
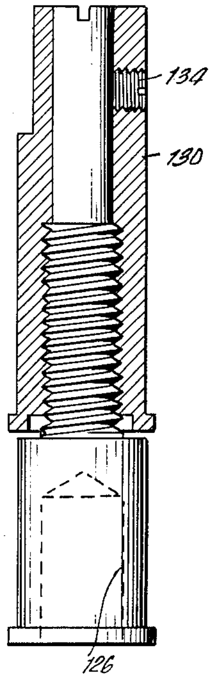
FIG. 6 is a sectional detailed view in an enlarged scale of a shaft employed in the modified form of the invention.
Figure 7:
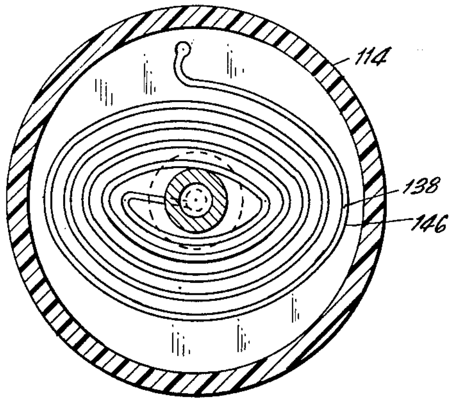
FIG. 7 is a horizontal sectional view taken along the plane of line 7—7 in FIG. 5 illustrating in particular the construction of the spiral groove; and, FIG. 8 is a horizontal sectional view taken along the plane of line 8—8 in FIG. 5 showing the elliptical conductors and their position on the disc.
Figure 8:
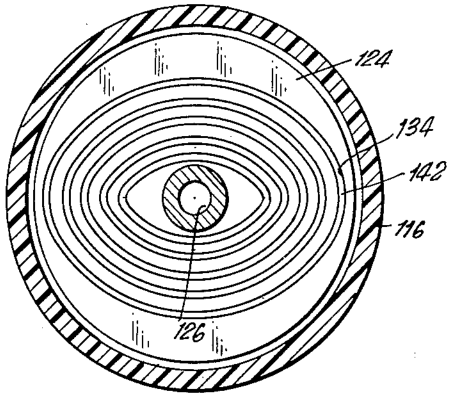

Referring now to the embodiment of FIGS. 5 through 8 there is shown a resonator 110 including a casing 112 formed in two parts 114 and 116 which may be secured together after assembly by any suitable manner such as by an adhesive or by fasteners, and which has journalled therein by means of bearing assemblies 118 and 120 a shaft 122 to which a disc 124 is fixed. Any suitable means may be provided for rotating the disc 126, it being noted that the shaft 122 is provided with a cavity 126 therein through which conductors 128 may be led, the conductors 128 being adapted to be connected to various conductors found on the disc 126. The upper end of the shaft 122 is externally threaded for threaded engagement in the internally threaded handle 130 which extends to the hub 132 of the casing 112 and which is threadedly secured on the shaft 102. The handle may of course be provided with a set screw 134 (see FIG. 6) attaching a finger member, or knob not shown, for facilitating the rotation of the shaft 122.

The disc 126 is provided with a series of elliptical grooves which are concentrically disposed about each other in the upper surface thereof. These grooves are generally indicated at 134. Another series of grooves, 136, also elliptical in shape, are positioned so as to open into the bottom surface of the disc 126. Both parts of the casings 112 are provided with an elliptical spiral groove therein. The casing portion 114 has grooves 138 formed therein while casing portion 116 has grooves 140 formed therein. A series of elliptical conductors 142 are formed in the grooves 134 while elliptical conductors 144 are formed in the grooves 136. Spiral conductors 146 and 148 are formed respectively in the spiral elliptical grooves 136 and 140. Each of the elliptical spiral grooves are arranged with their major axes capable of being aligned with the major axis of the elliptical conductors with the disc being capable of rotation to a position where the elliptical conductors are at a 90° relationship with respect to the spiral conductors. The innermost of the conductors 142 and 144 are connected to the ground wire 128 while other wires, not shown, are connected to the others of the elliptical conductors and to various electrical components of the circuit in which the resonator 110 is employed.

A plurality of terminals 160, 162 etc. are provided on the casing part 114 and are adapted to be connected along various points of the elliptical spiral conductors 146, 148.

The resonator 110 is adapted to be used in like manner to the resonator 10.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. A resonator comprising a casing of an insulating material, said casing having a flat inner surface, said casing having a spiral groove therein, a disc of an insulating material rotatably mounted in said casing, said disc having a plurality of concentric elliptical grooves therein, a spiral shaped conductor fixed in said spiral groove and spaced from said flat inner surface, and a plurality of concentric conductors of elliptical shape disposed in said elliptical grooves and spaced from the surface of said disc.

2. A resonator comprising a casing of electrically insulating material, said casing having a portion provided with a flat inner surface, said portion having a spiral groove therein opening into said flat inner surface, a spiral shaped electrical conductor disposed in said spiral groove, a disc of electrically insulating material rotatably mounted in said casing, said disc having a plurality of concentric elliptical grooves therein, and a plurality of electrical conductors of elliptical shape disposed in said elliptical grooves.

3. A resonator comprising a casing of electrically insulating material, said casing having opposed portions provided with flat inner surfaces, said portions each having a spiral groove therein, a spiral shaped electrical conductor disposed in each of said spiral grooves, a disc of electrically insulating material rotatably mounted in said casing, said disc having a plurality of concentric elliptical grooves therein on both sides of said disc, and a plurality of electrical conductors of elliptical shape disposed in said elliptical grooves.

4. A resonator comprising a casing of electrically insulating material, said casing having a portion provided with a flat inner surface, said portion having a spiral groove therein opening into said flat inner surface, a spiral shaped electrical conductor disposed in said spiral groove and spaced from said surface, a shaft rotatably mounted in said casing, a disc of electrically insulating material mounted on said shaft, said disc having a plurality of concentric elliptical grooves therein, a plurality of electrical conductors of elliptical shape disposed in said elliptical grooves, and means extending through said casing for rotating said shaft and hence said disc to vary the position of said elliptical conductors relative to said spiral conductor.

5. A resonator comprising a casing of electrically insulating material, said casing having a portion provided with a flat inner surface, said portion having a spiral groove therein opening into said flat inner surface, a coating of electrically conductive material deposited in said spiral groove forming a spiral shaped electrical conductor spaced from said flat inner surface, a shaft rotatably mounted in said casing, a disc of electrically insulating material mounted on said shaft, said disc having a plan surface and a plurality of concentric elliptical grooves therein opening into said planar surface, coatings of electrically conductive material deposited in said elliptical grooves forming a plurality of electrical conductors of elliptical shape spaced from said planar surface, said planar surface confronting said flat inner surface, means extending through said casing for rotating said shaft and hence said disc to vary the position of said elliptical conductors relative to said spiral conductors, and terminal posts on said casing electrically connected to said spiral conductor.

References Cited in the file of this patent

UNITED STATES PATENTS

| | | |
|---|---|---|
| 2,601,338 | Snyder | June 4, 1952 |
| 2,870,333 | Slate | Jan. 20, 1959 |